(12) United States Patent
Ishitsu

(10) Patent No.: US 7,050,634 B2
(45) Date of Patent: May 23, 2006

(54) METHOD, PROGRAM PRODUCT, AND DEVICE FOR DETECTING BRANCH POINT OF RANDOM LINE PATTERN

(75) Inventor: Yuji Ishitsu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 721 days.

(21) Appl. No.: 10/201,519

(22) Filed: Jul. 22, 2002

(65) Prior Publication Data

US 2003/0021480 A1   Jan. 30, 2003

(30) Foreign Application Priority Data

Jul. 26, 2001   (JP)   ............................. 2001-225933

(51) Int. Cl.
*G06K 9/46* (2006.01)
*G06K 9/42* (2006.01)
*G06K 9/00* (2006.01)

(52) U.S. Cl. .................... 382/204; 382/128; 382/258

(58) Field of Classification Search ........ 382/128–134, 382/173, 181, 190, 199, 219, 258, 312, 278, 382/204, 257; 356/71
See application file for complete search history.

(56) References Cited

U.S. PATENT DOCUMENTS

| 3,917,402 | A | * | 11/1975 | Ohta ............................ 356/71 |
| 4,040,009 | A | * | 8/1977 | Kadota et al. ............... 382/227 |
| 5,181,258 | A | * | 1/1993 | Nagao et al. ................ 382/206 |
| 5,231,678 | A | * | 7/1993 | Takatori et al. ............. 382/154 |
| 5,235,650 | A | * | 8/1993 | Jeong .......................... 382/158 |
| 5,351,304 | A | * | 9/1994 | Yamamoto ................... 382/125 |
| 6,868,190 | B1 | * | 3/2005 | Morton ....................... 382/278 |

FOREIGN PATENT DOCUMENTS

JP    7-210655 A    8/1995
JP    9-265540 A    10/1997

* cited by examiner

*Primary Examiner*—Kanjibhai Patel
(74) *Attorney, Agent, or Firm*—RatnerPrestia

(57) ABSTRACT

By a method of detecting a branch point, the branch point in a random line pattern of neovascularization or the like is detected accurately and efficiently. After a binary image is obtained from an original image, noise filling is performed for removing a noise in a line element to provide a filled image. The filled image is thinned to provide in a thinned image including the line element having its width change to one pixel. Plural previously-registered branch patterns are collated with the thinned image, and consequently, the branch point at which the line element of the random line pattern branches off is detected.

20 Claims, 12 Drawing Sheets

METHOD, PROGRAM PRODUCT, AND DEVICE FOR DETECTING BRANCH POINT OF RANDOM LINE PATTERN

FIELD OF THE INVENTION

The present invention relates to a method, program product, and device for detecting a branch point at which a line element branches off in a random line pattern formed by line elements having random shapes.

BACKGROUND OF THE INVENTION

In screening of drugs that is executed in a pharmaceutical industry or the like, cells of animals or plants, microorganisms, or others are fed with a drug subject to the screening under various conditions and cultured, and their changes with time are observed for verification of efficacy of the drug. To verify efficacy of anticancer drug, for example, examining the degree of cancer cell-induced neovascularization, that is, the degree of growth of a newly branching capillary is often observed. The more active this neovascularization is, the more active the proliferation of the cancer cell. The anticancer drug is verified effective if the neovascularization is stopped or slowed by the administrated drug. In conventional observation of this neovascularization, length and area of the neovascularization are extracted, as an index of the neovascularization, from a microscopic image of a living sample, and the degree of neovascularization is determined based on the index.

In the process of the neovascularization, the capillary grows while keeping branching out. To accurately ascertain the degree of neovascularization, it must be determined how the capillary branches out.

In the microscopic image, the capillaries form a complex, random line pattern including plural combinations of line elements having irregular shapes. In the conventional screening of the drugs that uses the length and area of the neovascularization as an index, the branching random line pattern cannot be extracted as actual data. Consequently, the degree of neovascularization is hardly determined.

SUMMARY OF THE INVENTION

A branch point of a line pattern is detected by performing binarization on an image including the line pattern including a line element branching off at the branch point to obtain a binary image, performing thinning on the binary image to obtain a thinned image including the line element reduced to a width of one pixel, and collating a plurality of previously registered branched patterns with the thinned image to detect the branch point.

The method enabled the branch point in the random line pattern to be detected accurately and efficiently.

DESCRIPTION OF THE PREFERRED EMBODIMENT

Figure 1:
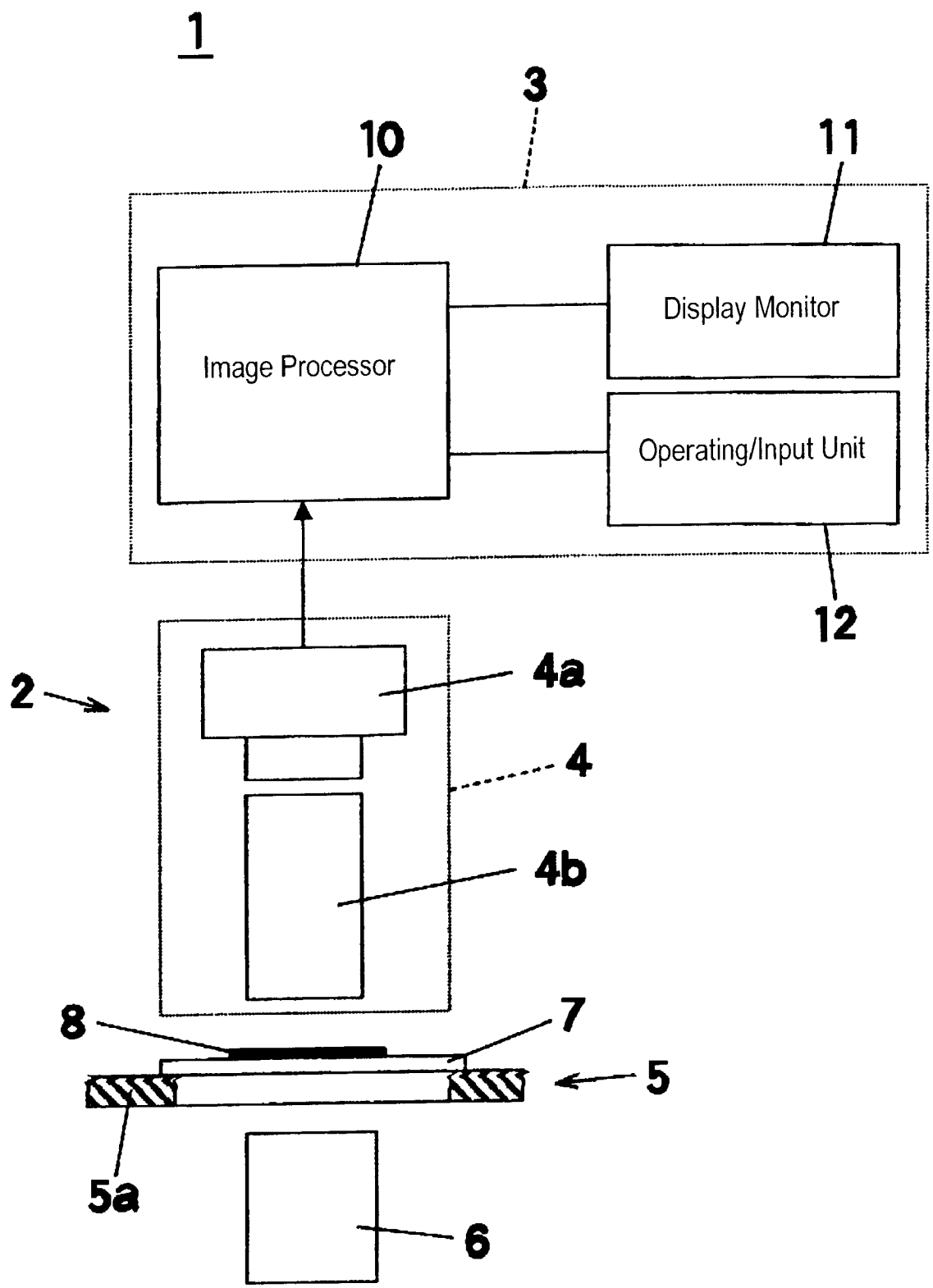
FIG. 1 is a section of a microscopic image recognition device in accordance with an exemplary embodiment of the present invention.
Figure 2:
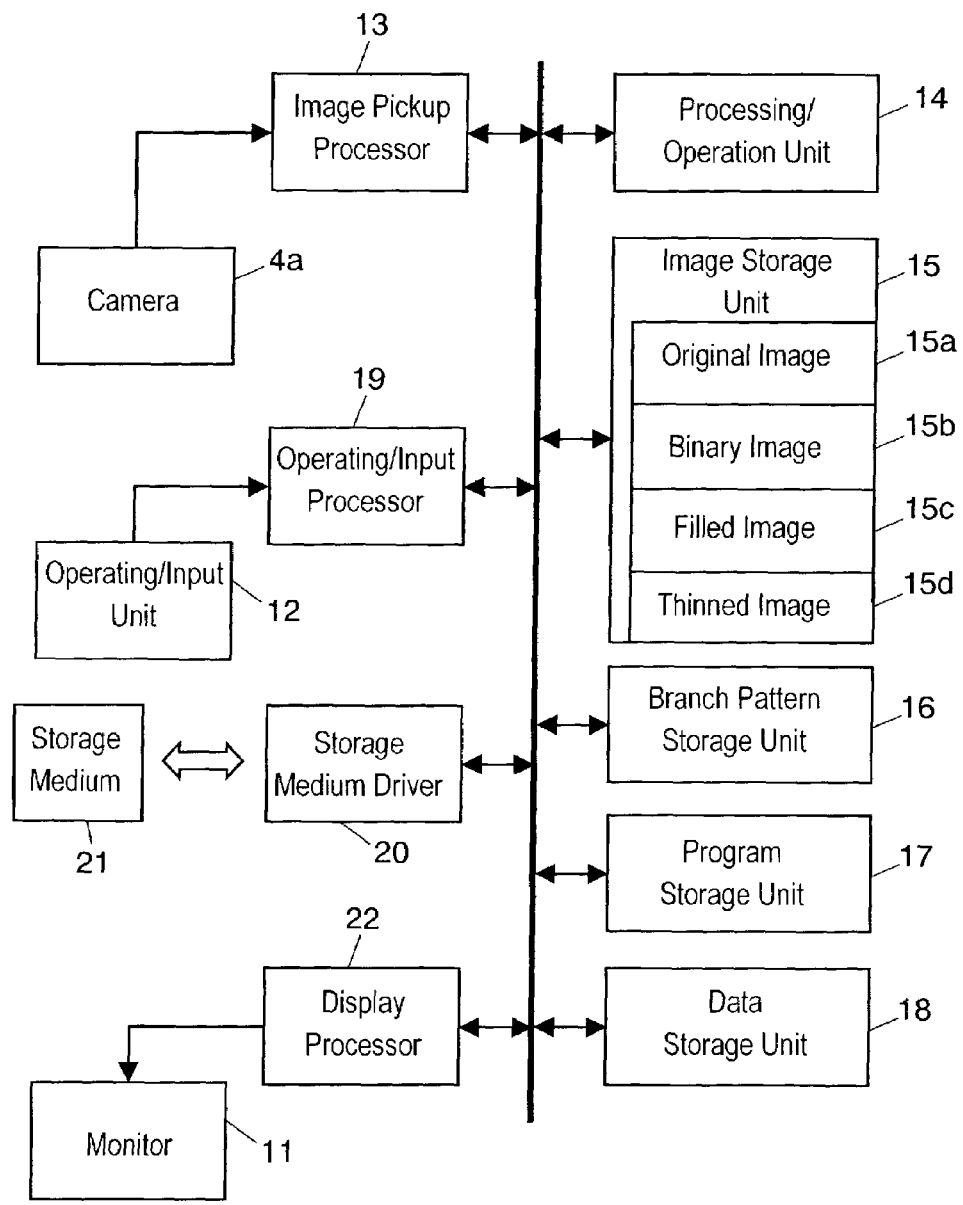
FIG. 2 is a block diagram of the microscopic image recognition device in accordance with the embodiment.
Figure 3:
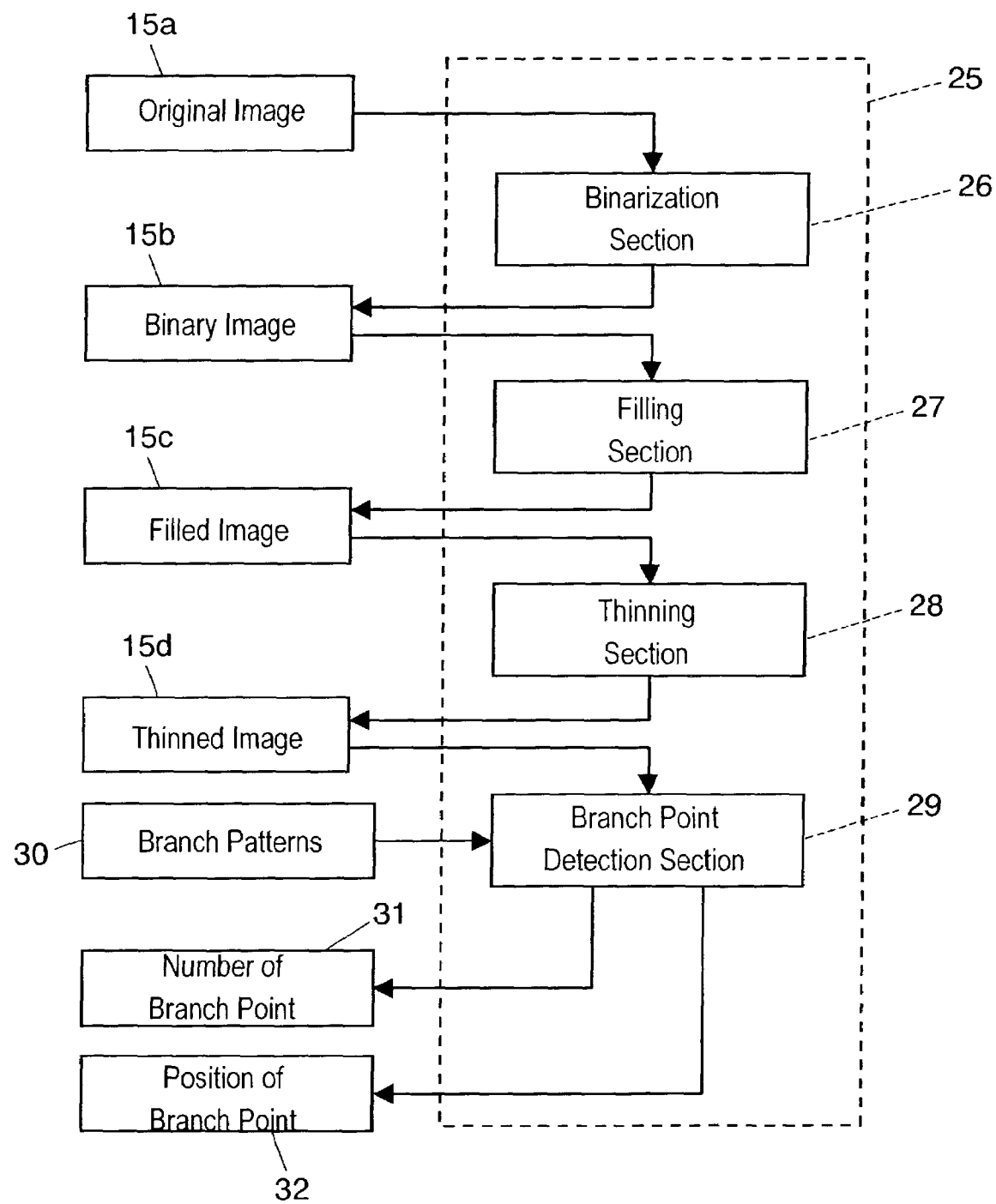
FIG. 3 is a functional block diagram of branch point detection performed by the microscopic image recognition device in accordance with the embodiment.
Figure 6:
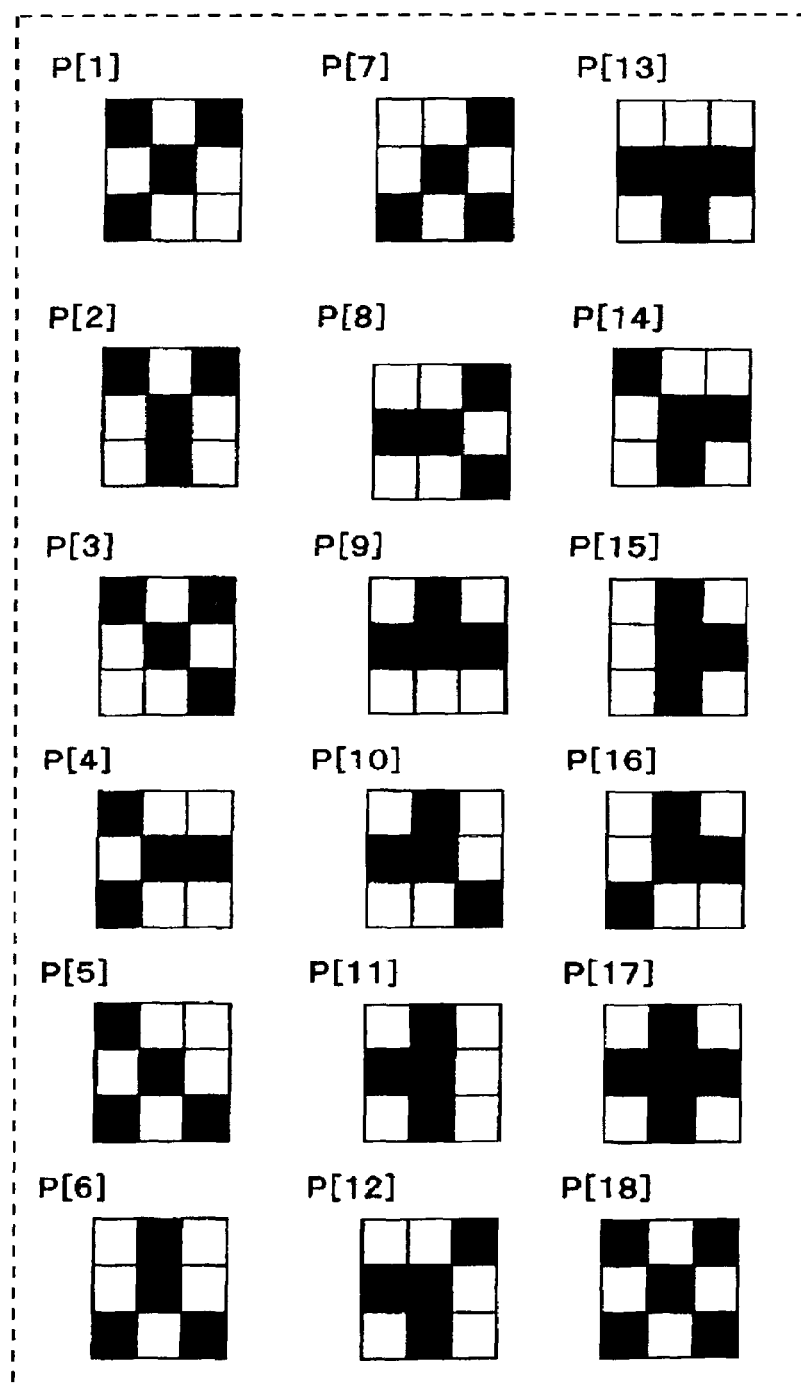
FIG. 6 illustrates branch patterns for the branch point detection performed on the random line pattern in accordance with the embodiment.
Figure 7:
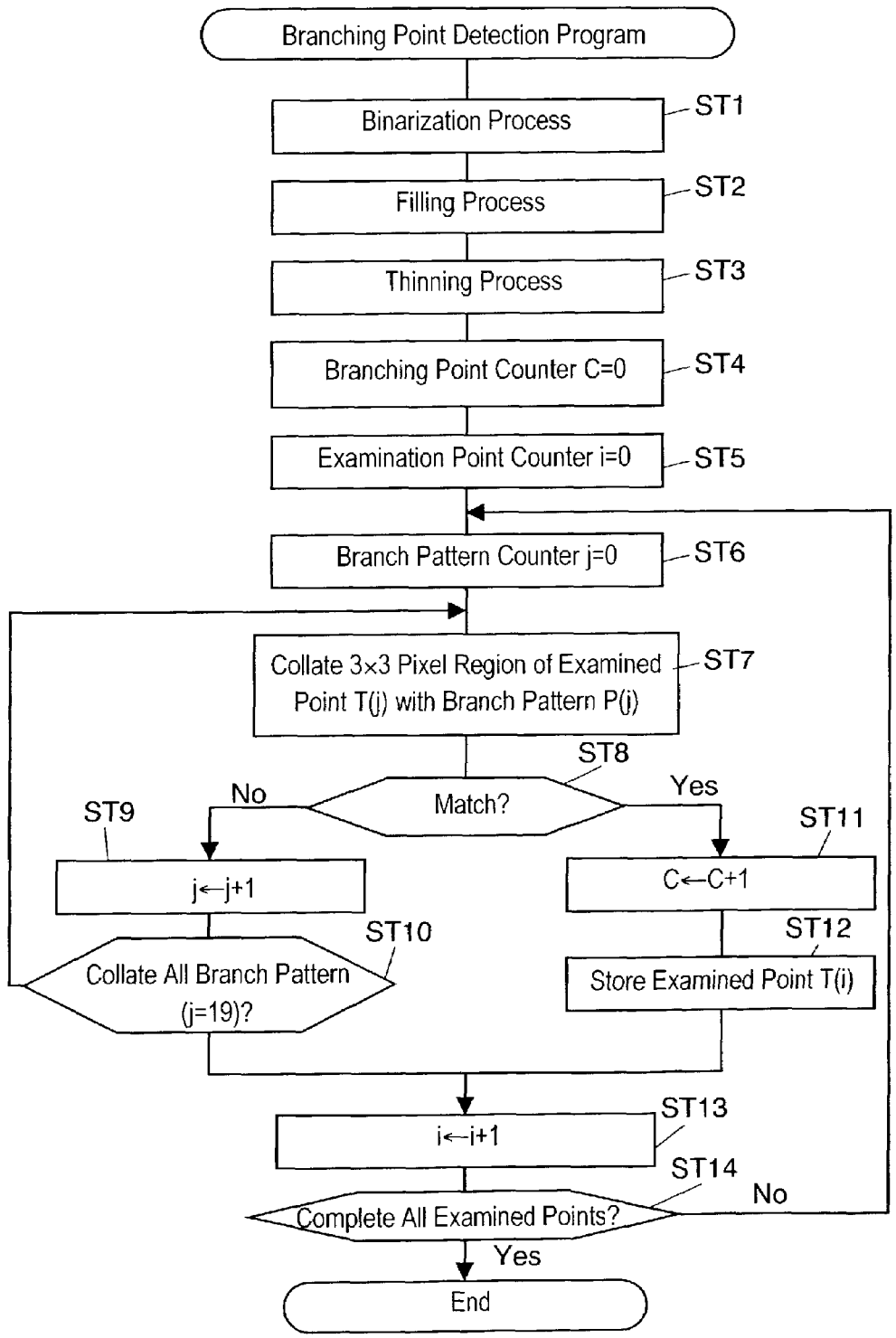
FIG. 7 is a flow chart of the branch point detection performed on the random line pattern in accordance with the embodiment.
Figure 8:
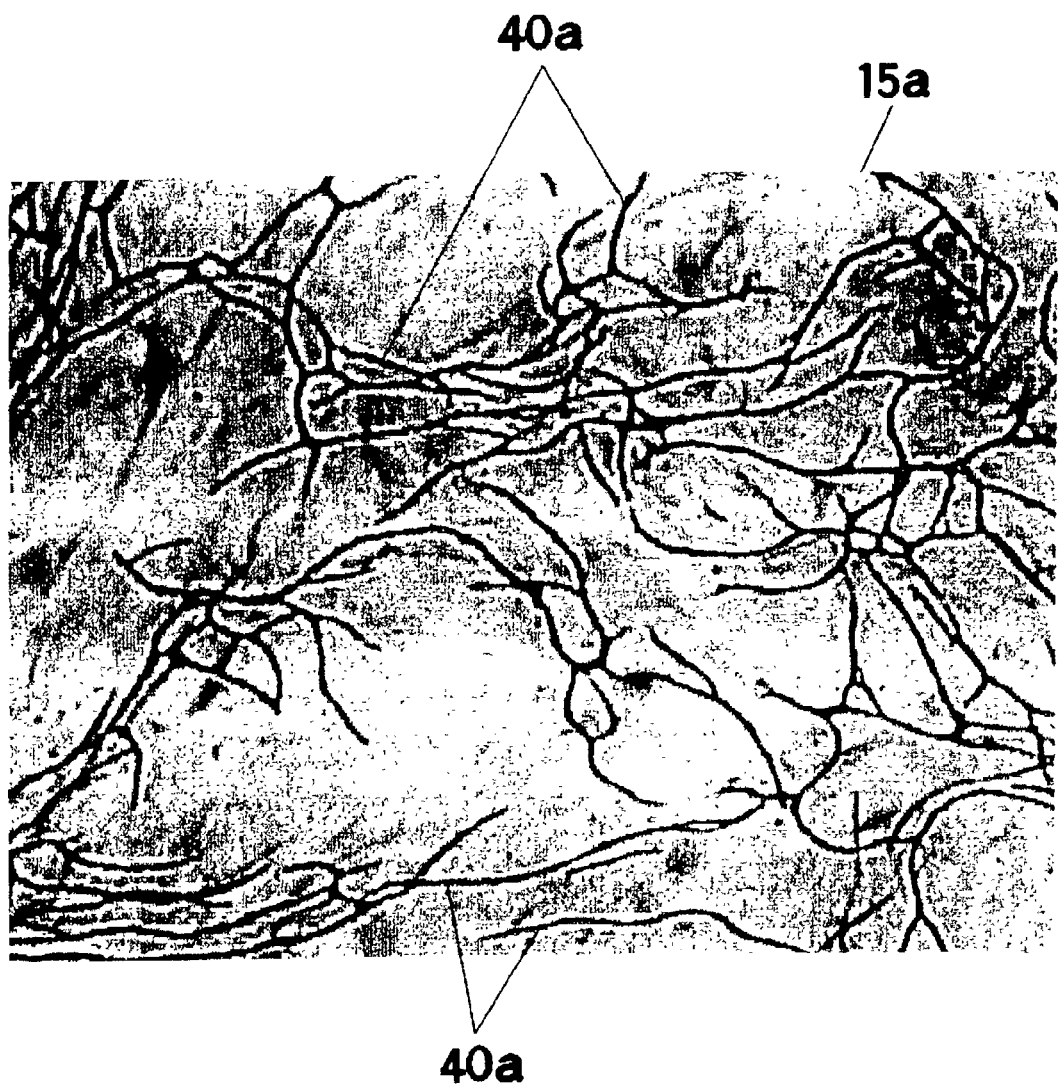
FIG. 8 is an original image in the branch point detection performed on the random line pattern in accordance with the embodiment.
Figure 9:
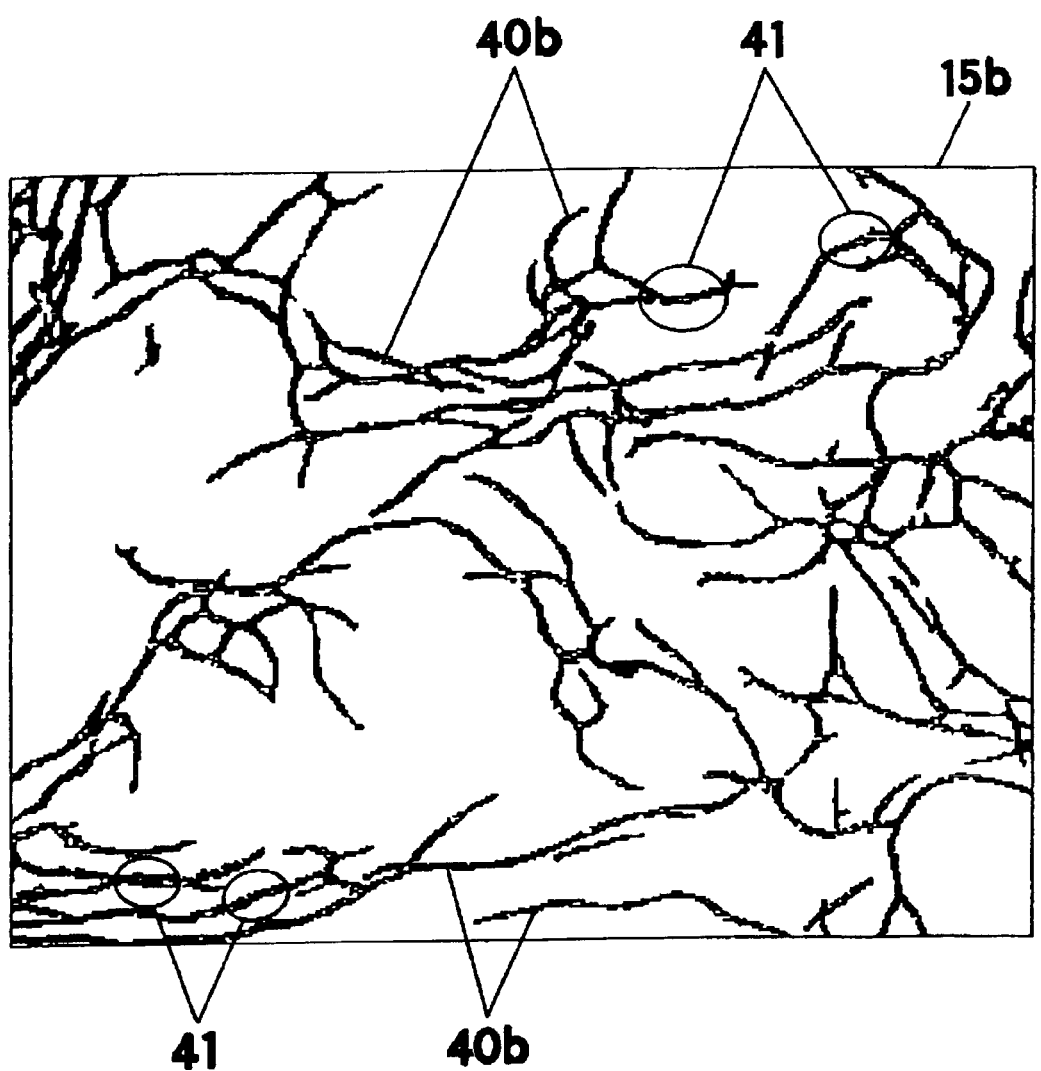
FIG. 9 is a binary image in the branch point detection performed on the random line pattern in accordance with the embodiment.
Figure 10:
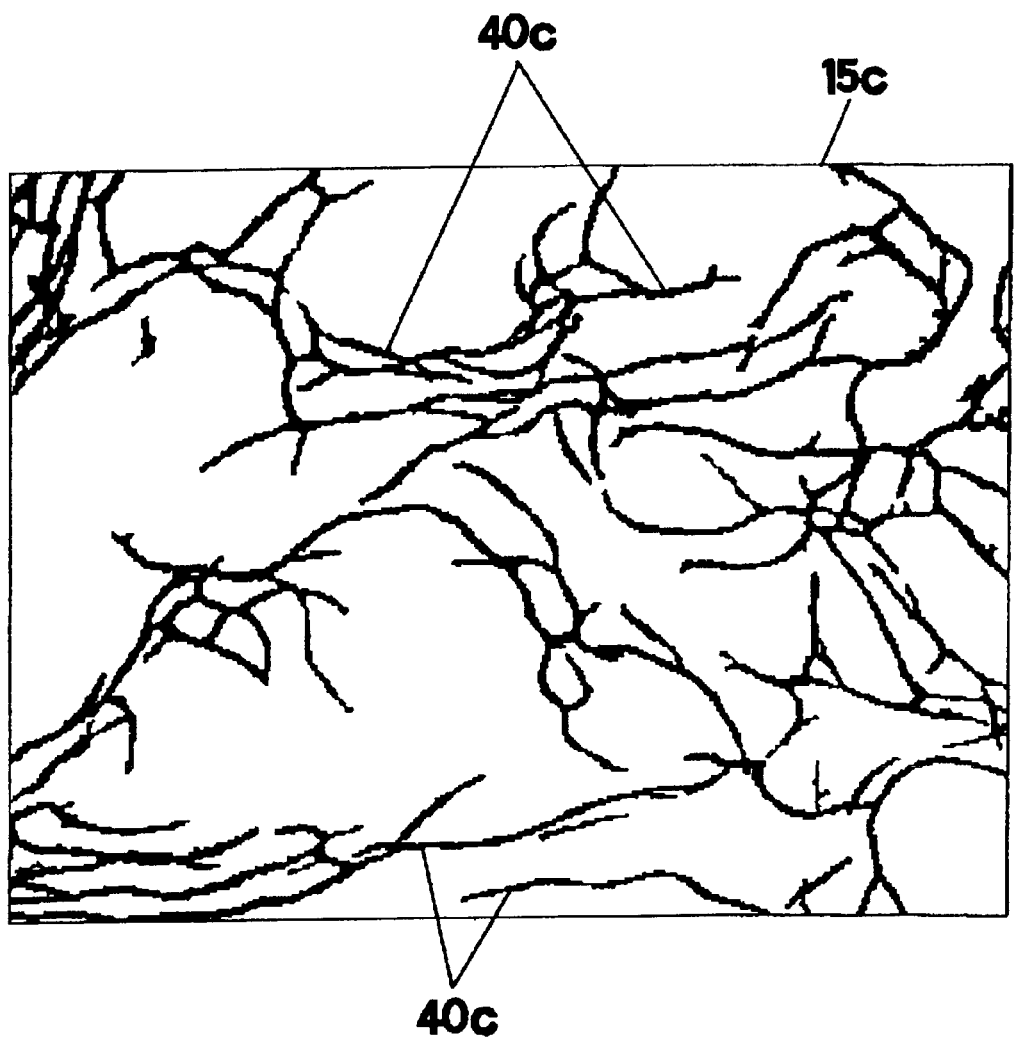
FIG. 10 is a filled image which has undergone noise filling in the branch point detection performed on the random line pattern in accordance with the embodiment.
Figure 11:
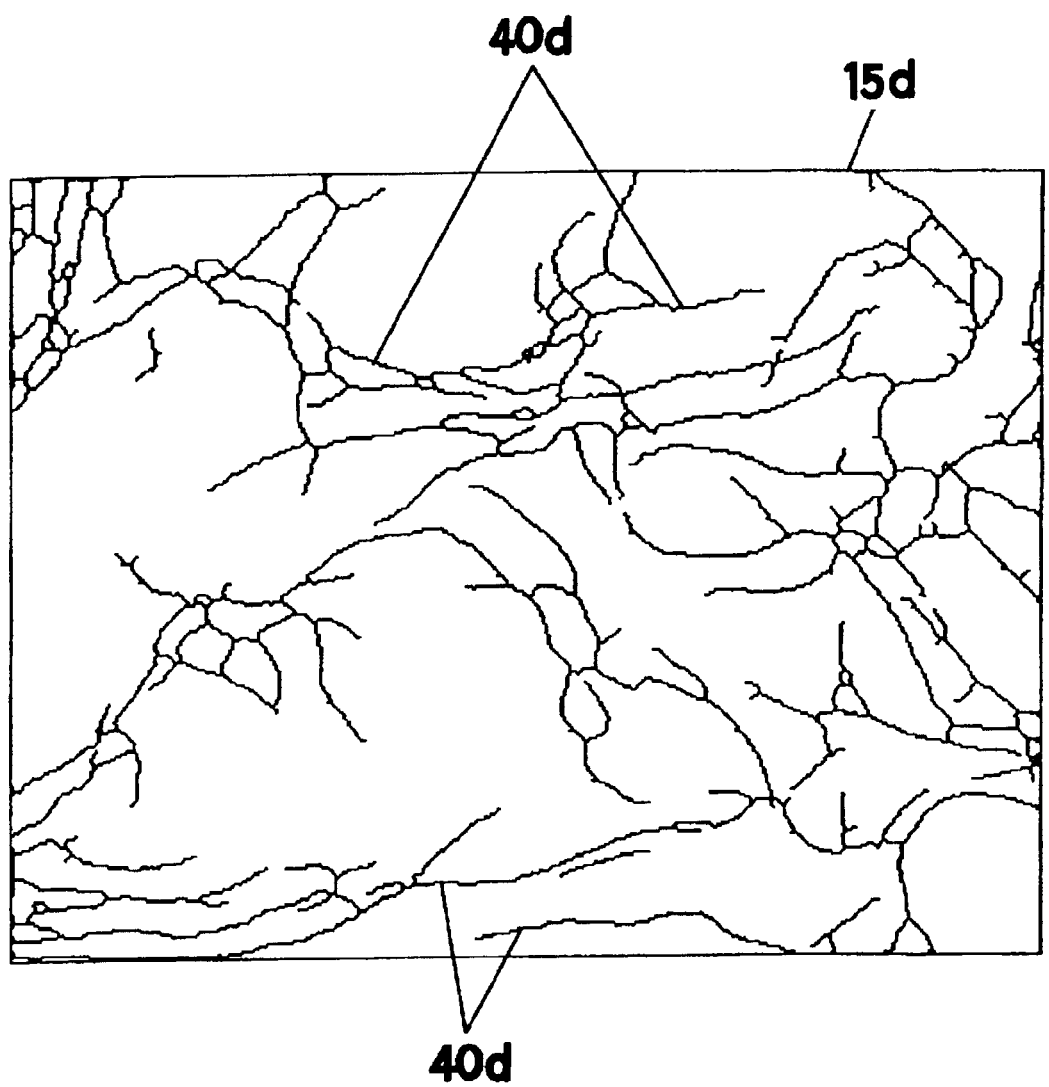
FIG. 11 is a thinned image in the branch point detection performed on the random line pattern in accordance with the embodiment.
Figure 12:
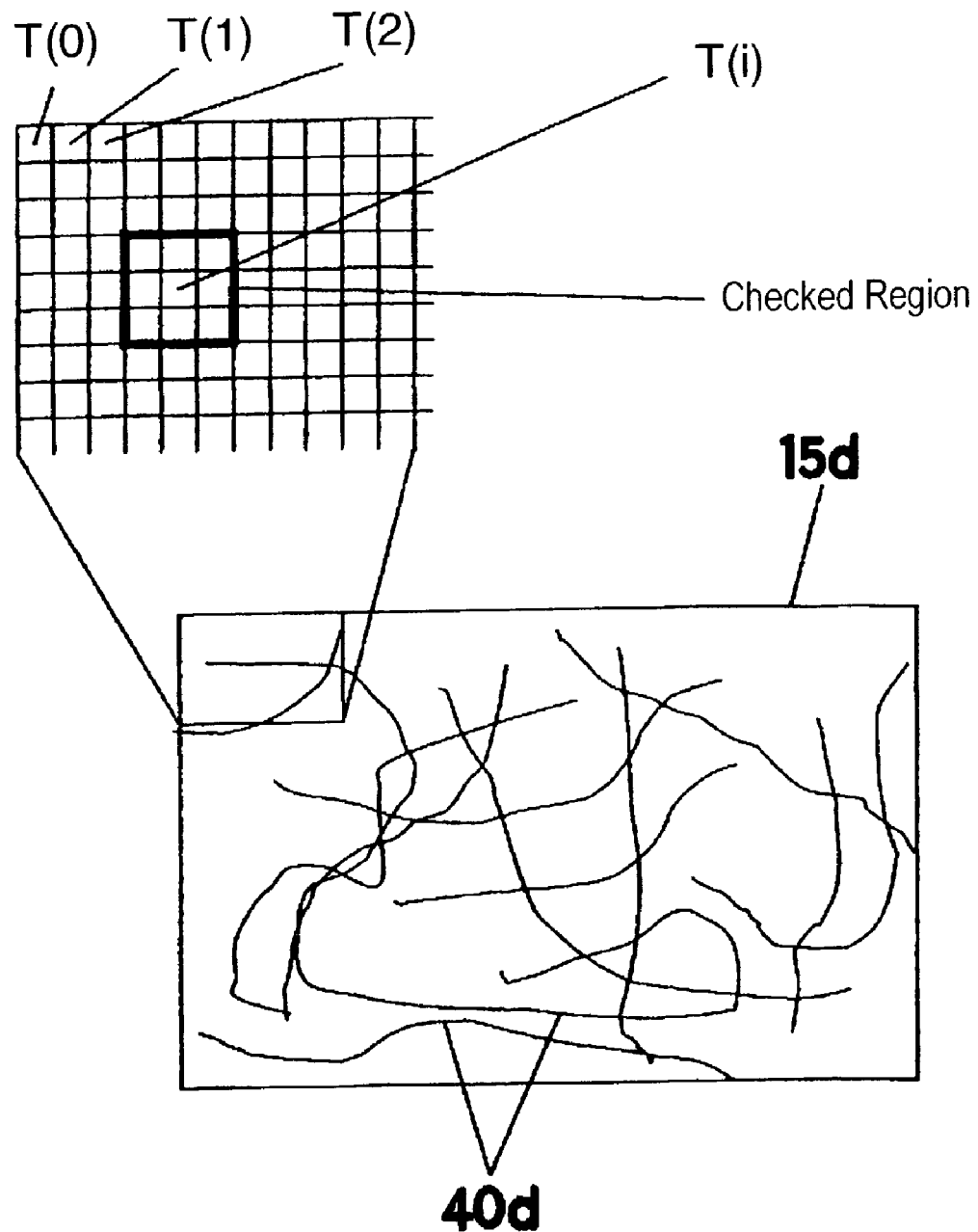
FIG. 12 illustrates a branch pattern matching in the branch point detection performed on the random line pattern in accordance with the embodiment.

FIG. 1 is a section of a microscopic image recognition device in accordance with an exemplary embodiment of the present invention, and FIG. 2 is a block diagram of the same microscopic image recognition device. FIG. 3 is a functional block diagram of branch point detection performed by the microscopic image recognition device. FIGS. 4A–4D illustrate image processing in the branch point detection performed on a random line pattern by the microscopic image recognition device. FIGS. 5A–5D illustrate branch patterns for the branch point detection performed on the random line pattern by the microscopic image recognition device. FIG. 6 illustrates branch patterns for the branch point detection performed on the random line pattern by the microscopic image recognition device. FIG. 7 is a flow chart of the branch point detection performed on the random line pattern by the microscopic image recognition device. FIG. 8 is an original image in the branch point detection performed on the random line pattern by the microscopic image recognition device. FIG. 9 is a binary image in the branch point detection performed on the random line pattern by the microscopic image recognition device. FIG. 10 is a filled image which has undergone noise filling in the branch point detection performed on the random line pattern by the microscopic image recognition device. FIG. 11 is a thinned image in the branch point detection performed on the random line pattern by the microscopic image recognition device. FIG. 12 illustrates a branch pattern matching in the branch point detection performed on the random line pattern by the microscopic image recognition device.

Referring to FIG. 1, the microscopic image recognition device will be explained. Microscopic image recognition device 1 is equipped with microscopic image pickup unit 2 and image recognition unit 3. Microscopic image pickup unit 2 includes camera-microscope 4 including digital camera 4a and microscope 4b, sample holder 5, and light source 6. Sample holder 5 is equipped with sample table 5a over which a sample, a subject of an image, is mounted, and glass plate 7 having sample 8 mounted thereon to be observed is mounted on sample table 5a.

While sample 8 illuminated from below on glass plate 7 by light source 6 turned on, camera 4a picks up an image of sample 8 through microscope 4b, thereby obtaining image data of a microscopic image of sample 8. Here, the sample to be observed is living tissue of cancer cells or the like, and the image of neovascularization in the living tissue is picked up as a random line pattern including plural random line elements representing capillaries.

A general personal computer may be used for image recognition unit 3. The image obtained by camera 4a is processed by image processor (personal computer) 10, and an obtained original image and a processed image are displayed on monitor 11. Various data and operations for image processing are input through operating/input unit 12 including a keyboard and mouse.

Referring to FIG. 2, a control system of microscopic image recognition device 1 will be explained. Image pickup processor 13 receives a digital image data obtained by camera 4a and performs image data processing necessary for image recognition intended for detection of a branch point at which the capillary branches off in the process of neovascularization. Processing/operation unit 14 may be a central processing unit (CPU) and performs various operations and processes by executing a processing program stored in program storage unit 17. Image storage unit 15 stores various image data obtained by camera 4a or processed. The image data includes original image 15a (FIG. 8) obtained by camera 4a, binary image 15b (FIG. 9) obtained by performing binarization on the original image, filled image 15c (FIG. 10) obtained by filling a noise appearing in the line element of the binary image, and thinned image 15d (FIG. 11) obtained by performing thinning on the filled image to obtain the line element having a reduced width equivalent to one pixel.

Branch pattern storage unit 16 stores branch patterns used as reference patterns in the branch point detection. Each of branch patterns is a patterned branching form of a line element of the random line pattern appearing in the microscopic image of the neovascularization, and the branch patterns corresponding to various branching forms, respectively, are stored.

Program storage unit 17 stores various processing programs including a branch point detection program. The programs are executed by processing/operation unit 14 for the branch point detection. Data storage unit 18 stores various data including detected data such as the number of branch points and positions of the branch points that are obtained in the branch point detection.

Operation/input processor 19 receives an input signal input through the keyboard or the mouse of operating/input unit 12 and performs necessary data processing. Storage medium 21, e.g. a memory card or a magnetic disk, stores the various data and programs. Storage medium driver 20 reads the data from storage medium 21 and writes the data into medium 21. The branch point detection program stored in medium 21 is read by driver 20 and stored in program storage unit 17, so that the general personal computer can function as image recognition unit 3. Display processor 22 performs data processing for displaying, on monitor 11, the various images stored in image storage unit 15 and on-screen guidance in the operation and input that are effected by operating/input unit 12.

Referring to FIG. 3 and FIGS. 4A–4D, the branch point detection will then be explained. In FIG. 3, the branch point detection program surrounded by frame 25 is a function implemented by processing/operation unit 14. First, camera 4a picks up original image 15a (FIG. 8) of sample 8 that shows the neovascularization, that is, the growth of the newly branching capillaries. The original image 15a includes the random line pattern including plural random line elements 40a each representing the capillary in the process of neovascularization.

Figure 4A:
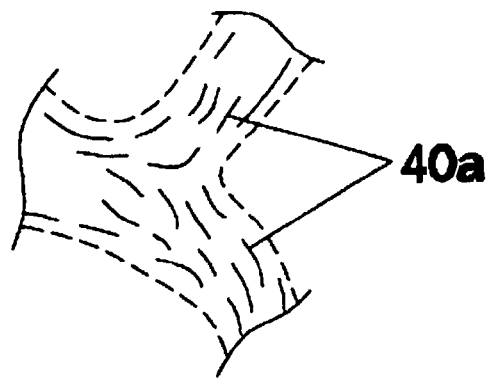
FIGS. 4A–4D illustrate image processing in the branch point detection performed on a random line pattern in accordance with the embodiment.
Figure 4B:
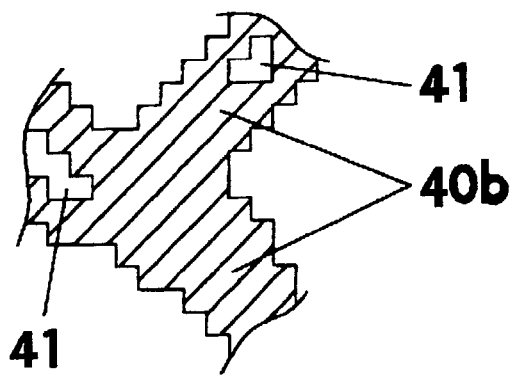

FIG. 4A shows an enlarged portion where line elements 40a branch off. Subsequent processes will be explained with reference to FIGS. 4A–4D. Binarization section 26 binarizes original image 15a to obtain binary image 15b (FIG. 9). In the binary image, pixels corresponding to line elements 40a are each represented by luminance value of "0", while a background is represented by luminance value of "1". Line elements 40a in original image 15a are converted to line elements 40b having a stepped boundary against the background, as shown in FIG. 4B.

Due to lights and shades of luminance of line elements 40a, a noise 41, a small cluster of pixels of luminance value of "1" exists in line elements 40b (see also FIG. 9). To remove the noise 41, noise filling section 27 fills the noise in binary image 15b, thereby obtaining filled image 15c (see also FIG. 10). Thus, resultant line elements 40c are all constructed of pixels of luminance value of "0" with noises 41 filled.

Figure 4C:
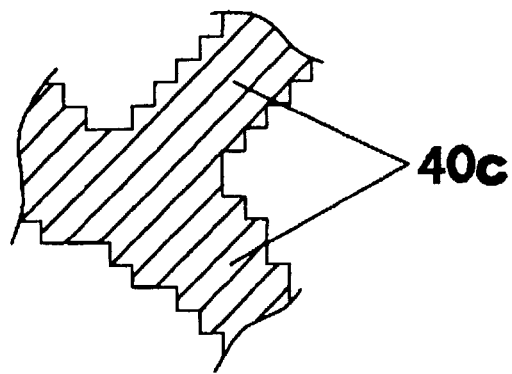
Figure 4D:
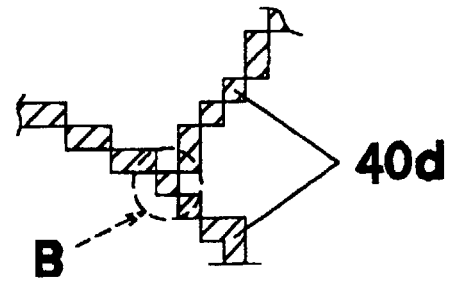

Thinning section 28 performs thinning on filled image 15c to obtain thinned image 15d (FIG. 11). Thus, line elements 40c shown in FIG. 4C are thinned to change into one-pixel-wide line elements 40d as shown in FIG. 4D. The pixel encircled by broken line B corresponds to a branch point at which two line elements 40d branch off.

Branch point detection section 29 collates, with thinned image 15d, a branch pattern P retrieved one after another from branch patterns 30, a group of branch patterns P stored in branch pattern storage unit 16. In this way, detection section 29 detects the branch point of the random line pattern, that is, the branch point at which the line element branches off from another line element forming a portion of the ransom line pattern. This branch point detection provides the number 31 of branch points in each processed image and branch position 32 including coordinates of each branch point as detected data. The detected data are stored in data storage unit 18.

Branch pattern P of branch patterns 30 will be explained individually with reference to FIGS. 5A–5D and FIG. 6. In the present embodiment, each branch pattern P is a binary pattern formed in grid region R of 3×3 pixels.

Figure 5A:
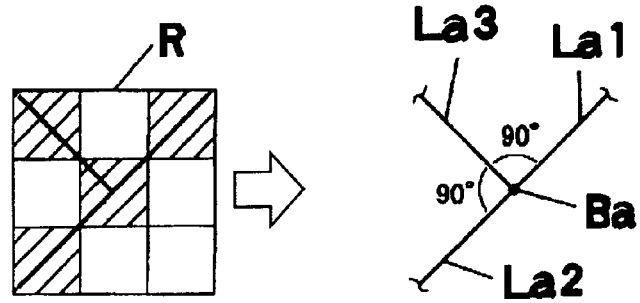
FIGS. 5A–5D illustrate branch patterns for the branch point detection performed on the random line pattern in accordance with the embodiment.
Figure 5B:
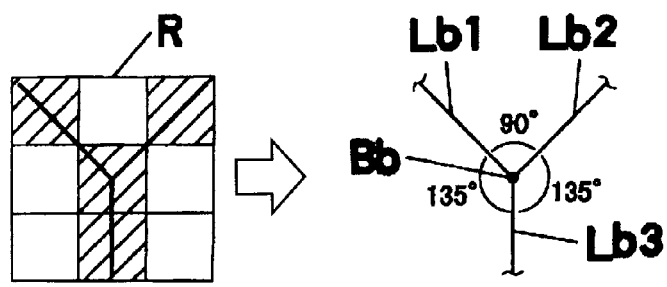

FIGS. 5A and 5B shows three-branch pattern including three branches (line elements) extending in three directions connected to one another at one branch point. FIG. 5A shows a pattern in which third branch La3 connected to branch point Ba connecting aligned first and second branches La1, La2, and third branch La3 forms an angle of 90° with first branch La1 as well as with second branch La2. FIG. 5B shows a pattern in which first, second, and third branches Lb1, Lb2, and Lb3 extending from different directions are connected to one another at branch point Bb, and first branch Lb1 forms an angle of 90° with second branch Lb2, and third branch Lb3 forms an angle of 135° with first branch Lb1 as well as with second branch Lb2.

Figure 5C:
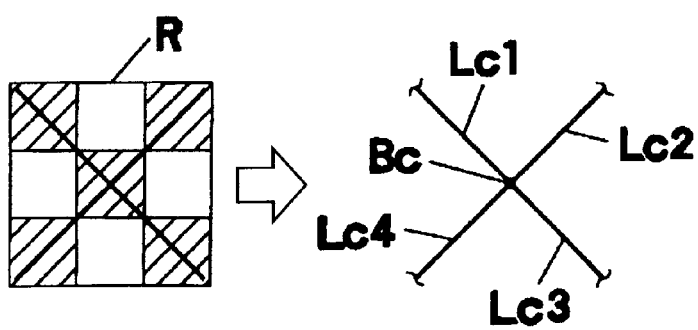
Figure 5D:
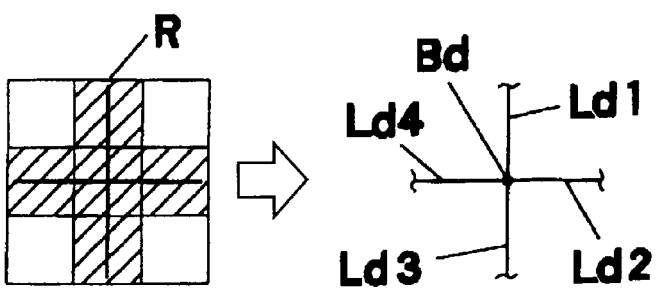

FIGS. 5C and 5D shows four-branch patterns in which four branches (line elements) extending in four directions are connected to one another at one branch point. In FIG. 5C, four branches Lc1, Lc2, Lc3, and Lc4 are connected at branch point Bc, a center, to cooperatively form an X-shape and form an angle of 90° with the neighboring branch. In FIG. 5D, four branches Ld1, Ld2, Ld3, and Ld4 are connected at branch point Bd, a center, to cooperatively form a cross-shape, and similarly to FIG. 5C, form an angle of 90° with the neighboring branch.

Branch pattern P, which can possibly be expressed in 3×3 pixel grid region R, are listed in FIG. 6, in which, eighteen possible patterns P(1)–P(18) are described. Patterns P(1)–P(16) are three-branch patterns, while patterns P(17) and P(18) are four-branch patterns illustrated by FIGS. 5D and 5C, respectively. Each of patterns P(1), P(3), P(5), and P(7) and the branch pattern illustrated by FIG. 5A are symmetric with respect to rotation, and each one of patterns P(2), P(4), P(6), and P(8) and the branched pattern illustrated by FIG. 5B are symmetric with respect to rotation. Similarly to this, patterns P(9), P(11), P(13), are P(15) are symmetric with respect to rotation, and patterns P(10), P(12), P(14), P(16) are symmetric with respect to rotation. The eighteen patterns include all the possible patterns in the 3×3 pixel grid region.

Each one of branch points of various branching forms of the capillaries sprouting in the process of neovascularization can be detected by collating these eighteen branched patterns P one after another for thinned image 15d obtained by the thinning which has been explained with reference to FIGS. 4A–4D. The branch patterns P are stored in the form of image data or numeric data in branch pattern storage unit 16.

Referring to the flow chart of FIG. 7, the branch point detection program will be described.

Original image 15a shown in FIG. 8 is binarized (ST1), and binary image 15b shown in FIG. 9 is thus obtained. The binary image undergoes noise filling (ST2), and consequently, filled image 15c shown in FIG. 10 is obtained. Filled image 15c undergoes thinning (ST3), thereby providing thinned image 15d shown in FIG. 11.

Then, the branch point detection is carried out for the thinned image 15d. In this process, the branch point is detected by collating, with branched patterns P of the 3×3 pixel grid region, examined point T(i) and its vicinity, that is, a checked region of 3×3 pixels including examined point T(i) as its center, as shown in FIG. 12. All the pixels of thinned image 15d are set as examination points T(i) one after another for the collation from a pixel at the upper left corner of thinned image 15d to a pixel at the lower right corner, as illustrated by FIG. 12.

Branch point counter (C), examination point counter (i), and branch pattern counter (j) are set so that C=0, i=0, and j=1 (ST4, ST5, ST6). The pixel at the upper left corner of thinned image 15d is thus set as first examined point T(0). Then, the 3×3 pixel region including examined point T(0) at its center is collated with branch pattern P(j). In other words, branch patterns P(1)–P(18) shown in FIG. 6 are collated one after another (ST7).

It is determined whether collated branch pattern P(j) matches the 3×3 pixel region including examined point T(0) at the center (ST8). If the pattern does not match, branch pattern counter (j) is incremented by 1 (ST9), and it is then determined whether all the branch patterns are collated, that is, whether branch pattern counter (j) counts up to 19 (ST10). If a yet-to-be-collated branch pattern exists, the yet-to-be-collated branch pattern is collated with examined point T(0) (ST7). If all the branch patterns are collated, examination point counter (i) is incremented by 1 (ST13), and subsequent examined point T(1) (T(i+1)) is collated.

If the 3×3 pixel region corresponding to a vicinty region of examined point T(0) matches the branch pattern P(j) in step ST8, branch point counter (C) is incremented by 1 (ST11), and the position of examined point T(0) is stored in data storage unit 18 (ST12). Then, examination point counter (i) is incremented by 1 (ST13), and subsequent examined point T(1) (T(i+1)) is collated.

The collation described above is repeated for all the pixels of thinned image 15d. When each of the pixels set as point T(i) is to be collated, it is determined whether all the examined points are collated (ST14). Then, if yet-to-be-collated examined point T(i) exists, the similar collation is repeated for the examined point (ST6). If the collation for all the examined points is completed (ST14), the branch point detection program terminates.

As described above, in the branch point detection for the neovascularization described in the present embodiment, the binarization, noise filling, and thinning are performed for the original image of the picked up sample. These processes provides the thinned image including one-pixel-wide line elements representing capillaries in the process of neovascularization, and detects the branch point at which the line elements branch off by collating the thinned image with the previously registered branch patterns.

In the present embodiment, an extremely simple image or grid region of 3×3 binary pixels is used as the branch patterns used for the collation. In other words, a variety of actual branching forms can be organized into a limited number of the branch patterns. The branch patterns are collated with the thinned image, so that load on the collation in the image processing can be reduced. Moreover, the branch point and the branching form can be detected accurately and efficiently, and thereby, the degree of the neovascularization is determined accurately and efficiently based on the number of branch points, which has been hardly determined.

In the embodiment described above, the random line pattern including the line elements as the capillaries in the process of neovascularization is determined. However, the present invention is not limited to this, and is applicable to, for example, detection of a branch point at which dendrites forming a random line pattern of nerve cells in living tissue branch off. Besides the pattern of the living tissue, the present invention is applicable to a general random line pattern formed by plural line elements, and may provide that binarization and thinning performed on the line elements in image processing.

What is claimed is:

1. A method of detecting a branch point of a line pattern, said method comprising the steps of:
   binarizing an image to obtain a binary image, the image including the line pattern including a line element branching off at the branch point;
   thinning the binary image to obtain a thinned image, the thinned image including the line element thinned to have a width equivalent to one pixel; and
   collating a plurality of previously-registered branch patterns with the thinned image to detect the branch point, wherein the branch point is detected if one of the plurality of previously-registered branch patterns matches a portion of the thinned image.

2. The method of claim 1, wherein each of the plurality of branch patterns include a 3×3 pixel binary pattern.

3. The method of claim 1, wherein the plurality of branch patterns include a plurality of three-branch patterns.

4. The method of claim 1, wherein the plurality of branch patterns include a plurality of four-branch patterns.

5. The method of claim 1, the step of binarizing the image further comprising the step of:
   filling a noise in the line element of the binary image if the line element of the binary image has the noise therein, wherein said step of thinning the binary image comprises thinning the binary image having the noise in the line element filled.

6. An article of manufacture comprising a computer usable medium having computer readable program code means embodied therein for detecting a branch point of a line pattern, said computer readable program code means for causing a computer to effect:

binarizing an image including a line pattern including a line element branching off at a branch point to obtain a binary image;

thinning the binary image to obtain a thinned image including the line element having a width equivalent to one pixel; and collating a plurality of previously-registered branch patterns with the thinned image to detect the branch point, wherein the branch point is detected if one of the plurality of previously registered branch patterns matches a portion of the thinned image.

7. An article of manufacture as recited in claim 6, wherein the plurality of branch patterns include a 3×3 pixel binary pattern.

8. An article of manufacture as recited in claim 6, wherein the plurality of branch patterns include a plurality of three-branch patterns.

9. An article of manufacture as recited in claim 6, wherein the plurality of branch patterns include a plurality of four-branch patterns.

10. An article of manufacture as recited in claim 6, wherein, when binarizing the image, said computer readable program code means further causes said computer to effect:

filling a noise in the line element of the binary image if the line element of the binary image has the noise therein, wherein thinning the binary image comprises thinning the binary image having the noise in the line element filled.

11. A storage medium readable by a computer, for storing a program product for making the computer execute a method of detecting a branch point of a line pattern, said method comprises the steps of:

binarizing an image to obtain a binary image, the binary image including the line pattern including a line element branching off at the branch point;

thinning the binary image to obtain a thinned image, the thinned image including the line element thinned to have a width equivalent to one pixel; and collating a plurality of previously-registered branch patterns with the thinned image to detect the branch point, wherein the branch point is detected if one of the plurality of previously-registered branch patterns matches a portion of the thinned image.

12. The storage medium of claim 11, wherein the plurality of branch patterns include a 3×3 pixel binary pattern.

13. The storage medium of claim 11, wherein the plurality of branch patterns include a plurality of three-branch patterns.

14. The storage medium of claim 11, wherein the plurality of branch patterns include a plurality of four-branch patterns.

15. The storage medium of claim 11, wherein said step of binarizing the image further comprises the step of:

filling a noise in the line element of the binary image if the line element of the binary image has the noise therein, wherein said step of thinning the binary image comprises thinning the binary image having the noise in the line element filled.

16. A device for detecting the branch point, comprising:

a pattern storage section for storing a plurality of branch patterns;

a binarization section for binarizing an image to obtain a binary image, the image including a line pattern including a line element branching off at the branch point;

a thinning section for thinning said binary image to obtain a thinned image, the thinned image including said line element thinned to have a width equivalent to one pixel; and a branch point detection section for collating said plurality of branch patterns with said thinned image to detect said branch point, wherein said branch point detection section detects the branch point if one of the plurality of previously registered branch patterns matches a portion of the thinned image.

17. The device of claim 16, wherein said plurality of branched patterns include a 3×3 pixel binary pattern.

18. The device of claim 16, wherein said plurality of branched patterns include a plurality of three-branch patterns.

19. The device of claim 16, wherein said plurality of branch patterns include a plurality of four-branch patterns.

20. The device of claim 16, further comprising:

a noise filling section for filling a noise in said line element of said binary image, wherein said thinning section thins the binary image having the noise in the line element filled.

* * * * *